United States Patent [19]
Mancy et al.

[11] 3,821,366
[45] June 28, 1974

[54] ANTIBIOTIC 19,402 R.P.
[75] Inventors: Denise Mancy, Val-de-Marne; Leon Ninet; Jean Preud'Homme, both of Paris, all of France
[73] Assignee: Rhone-Poulenc S.A., Paris, France
[22] Filed: Feb. 21, 1968
[21] Appl. No.: 707,233

[30] Foreign Application Priority Data
Feb. 22, 1967  France .............................. 67.96051

[52] U.S. Cl. .................................. 424/117, 195/80
[51] Int. Cl. ........................................... A61k 21/00
[58] Field of Search ........................ 424/117; 195/80

[56] References Cited
FOREIGN PATENTS OR APPLICATIONS
846,801  8/1960  Great Britain ..................... 424/117

Primary Examiner—Jerome D. Goldberg
Attorney, Agent, or Firm—Stevens, Davis, Miller and Mosher

[57] ABSTRACT

The new antibiotic designated 19,402 R.P. — an acid — is obtained by the cultivation of the microorganism "Streptomyces 6227" or "Streptomyces peruviensis" NRRL 2757, the characteristics of which are described in British Pat. No. 846,801. The antibiotic and its alkali metal salts are particularly active against gram-positive microorganisms.

2 Claims, 1 Drawing Figure

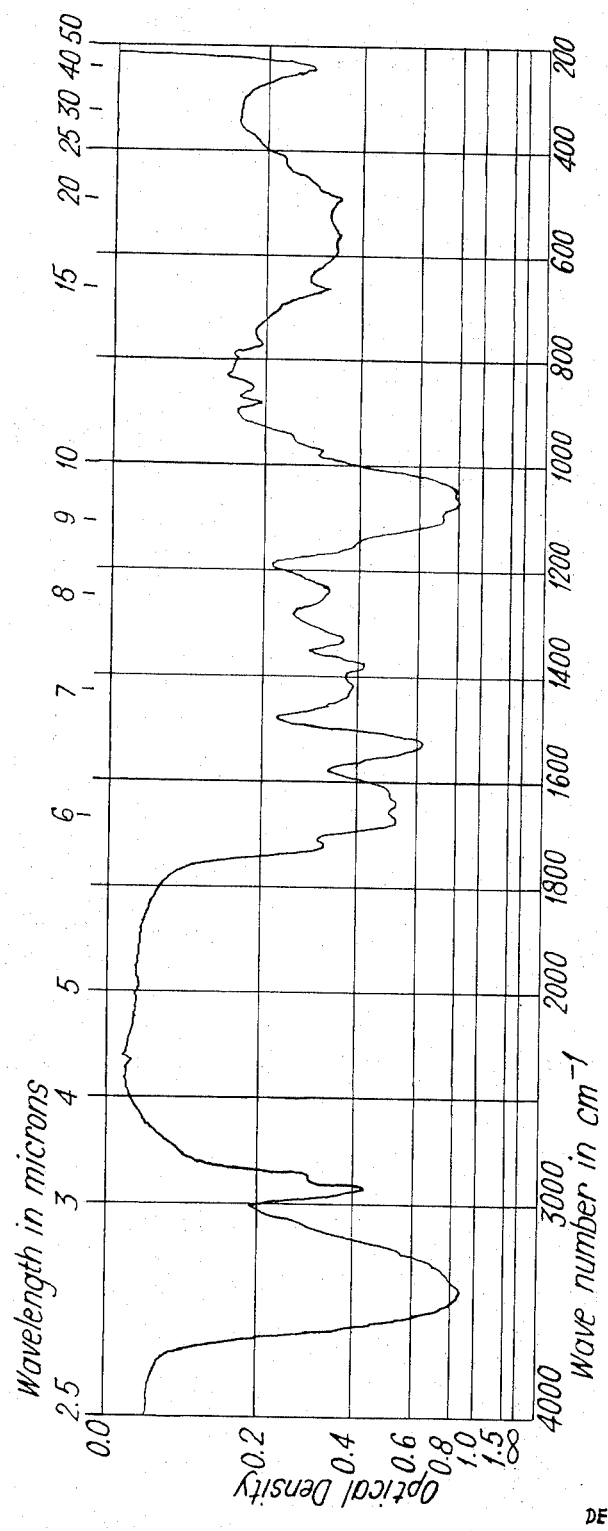

ANTIBIOTIC 19,402 R.P.

This invention relates to new antibiotic, hereinafter designated by the No. 19,402 R.P., and salts thereof, to a process for their preparation and pharmaceutical compositions containing them.

This new antibiotic is of very particular interest because of its high antibacterial activity against gram-positive microorganisms.

19,402 R.P. is obtained from artificial culture media containing a microorganism belonging to the streptomyces genus and designated by the name "Streptomyces 6227" or "Streptomyces peruviensis" (NRRL 2757), which has already been described in British Pat. No. 846,801 entitled "Antiobiotic 6798 R.P. and process for its preparation" applied for on May 27, 1958 and granted to Societe des Usines Chimiques Rhone-Poulenc. The description of the culture characteristics and biochemical properties of "Streptomyces 6227" or "Streptomyces peruviensis" (NRRL 2757), a culture of which is with the Northern Utilization Research and Development Division of the Agricultural Research Service of the United States Department of Agriculture at Peoria, Ill., and assigned the No. NRRL 2757, in that patent is incorporated in this specification by specific reference.

19,402 R.P. is an acid whose sodium salt has the following physico-chemical properties:

Appearance: white amorphous powder
Solubility: very soluble in water, soluble in anhydrous methanol, and in ethanol, propanol and isopropanol containing water, very sparingly soluble in anhydrous ethanol, propanol, isopropanol and butanol, and insoluble in acetone, hexane, benzene, diethyl ether, chloroform and ethyl acetate.
Ultra-violet spectrum (determined with a solution of 0.04 mg/l. in water):

absorption maximum at 256 nm : $E_{1\ cm}^{1\ percent} = 102.5$ absorption minimum at 227 nm : $E_{1\ cm}^{1\ percent} = 18.7$ Infra-red spectrum (determined with tablets of a mixture with potassium bromide).

This spectrum is shown in the accompanying drawing in which the abscissae give the wavelength expressed in microns (upper scale) and the wave numbers in $cm^{-1}$ (lower scale), and the ordinates give the optical densities.

The principal infra-red absorption bands of the salt are given in Table I which follows:

TABLE I

| | | | | |
|---|---|---|---|---|
| 3420 vs | 1620 m | 1070 vs | 710 sh | where |
| 3300 sh | 1530 s | 1045 s | 665 m | vs = very strong |
| 3100 sh | 1420 m | 972 m | 595 w | s = strong |
| 2930 s | 1380 m | 955 w | 575 s | m = medium |
| 2870 m | 1330 m | 883 m | 495 m | w = weak |
| 1720 m | 1240 m | 855 m | 475 sh | sh = shoulder |
| 1675 s | 1155 sh | 800 w | 425 w | |
| 1645 m | 1100 s | 775 w | 385 sh | |

Optical rotation
$[\alpha]_D^{20} = + 1.9 \pm 1°$ (c = 0.4, water)
$[\alpha]_{436}^{20} = + 7.5 \pm 1'$ (c = 0.4, water)
$[\alpha]_{365}^{20} = + 9.0 \pm 1°$ (c = 0.4, water)
Elementary composition
C = 46.25 percent, H = 6.9 percent, O = 36.7 percent, N = 4.1 percent, P = 2.4 percent, S = 0.6 percent, Na = 3.05 percent.

It does not dialyse across a regenerated cellulose membrane (Cellophane type).

The sodium salt of 19,402 R.P. can be identified by electrophoretic migration on an agarose gel buffered to pH 8 by means of a glycine buffer (agarose is a neutral linear polymer of galactose): there is a migration of 13 × $10^{-3}$ cm/volt/hour towards the anode.

The sodium salt of 19,402 R.P. can also be identified by chromatography on various supports. The Rf values obtained with various development solvents are given in Table II (development is carried out at 20°C., and microbiological revelation by applying the chromatograms to an agar plate inoculated with Staphylococcus aureus 209 P for 5 minutes and then incubating overnight at 37°C.).

TABLE II

| Support | Development Solvent | Rf |
|---|---|---|
| Silica gel G | Isopropanol-2N ammonia (70:30 by volume) | 0.37 |
| Silica gel G + Alumina G (70:30 by weight) | Isopropanol-n-butanol-water (50:40:30 by volume) | 0.35 |
| Silica gel G + Alumina G (50:50 by weight) | Isopropanol-n-butanol-water (50:40:30 by volume) | 0.30 |
| Silica gel H | Dioxan-water (80:20 by volume) | 0.20 |
| Arches 302 paper, unbuffered (60.40 by volume) | n-butanol-acetic acid | 0.62 |
| | n-butanol-acetic acid-water (60:40:10 by volume) | 0.48 |
| | ethyl acetate-pyridine-water (50:40:30 by volume) | 0.30 |

The bacteriostatic activity of 19,402 R.P. towards a certain number of microorganisms was determined by a conventional dilution method. For each microorganism the minimum concentration of antibiotic was determined which, under specified conditions, inhibits any visible development in an appropriate nutrient broth. The results of various determinations are summarised in Table III, in which the minimum bacteriostatic concentrations of the antibiotic are expressed in micrograms of substance per cc. of test medium.

These various determinations show that the activity of 19,402 R.P. is principally exerted against microorganisms which accept the Gram stain; its activity against Streptococcus haemolyticus is particularly high. It has relatively little effect on gram-negative microorganisms although its activity against Neisseria gonorrhaeae and Brucella abortus bovis is appreciable. It does not show any cross resistance with the following antibiotics: penicillin, streptomycin, tetracycline, chloramphenicol, spiramycin, carbomycin, erythromycin, pristinamycin and novobiocin.

The antibacterial activity of 19,402 R.P. was confirmed in vivo with laboratory animals experimentally infected with microorganisms such as streptococci, pneumococci and staphylococci. It proved particularly effective when administered subcutaneously to mice. It also possesses a very good preventive activity towards staphylococcal or streptococcal infections of mice when administered subcutaneously or intravenously.

The toxicity of 19,402 R.P. has been studied principally with mice. The 50 percent lethal dose, or $LD_{50}$,

TABLE III

| Bacterial organisms tested | Minimum bacteriostatic concentrations (in µg/cc.) |
| --- | --- |
| Staphylococcus aureus — 209 P strain — ATCC 6538 P | 0.10 |
| Staphylococcus aureus — 133 strain (institut Pasteur) | 0.10 |
| Staphylococcus aureus — Smith strain | 0.25 |
| Sarcina lutea ATCC 9341 | 40 |
| Streptococcus faecalis — ATCC 9790 | 150 |
| Streptococcus viridans (Institut Pasteur) | 0.8 |
| Streptococcus pyogenes haemolyticus (Dig 7 strain, Institut Pasteur) | 0.01 |
| Neisseria gonorrhaeae (A 150 — Institut Pasteur) | 2.5 |
| Diplococcus pneumoniae (Til strain, Institut Pasteur) | 0.07 |
| Bacillus subtilis — ATCC 6633 | 20 |
| Bacillus cereus — ATCC 6630 | 0.01 |
| Mycobacterium species — ATCC 607 | 30 |
| Mycobacterium para smegmatis (A 75 — Lausanne) | 40 |
| Escherichia coli — ATCC 9637 | 30 |
| Shigella dysenteriae — Shiga L (Institut Pasteur) | 70 |
| Salmonella paratyphi A (Lacasse, Institut Pasteur) | 90 |
| Salmonella schottmuelleri (paratyphi B) Fougenc (Institut Pasteur) | 60 |
| Proteus vulgaris | 125 |
| Klebsiella pneumoniae — ATCC 10,031 | 75 |
| Pseudomonas aeruginosa (Bass strain — Institut Pasteur) | 50 |
| Brucella bronchiseptica (CN 387 — Wellcome Institute) | 15 |
| Brucella abortus bovis B 19 | 1 |
| Pasteurella multocida (A 125, Institut Pasteur) | 0.8 |
| Reiter's treponema | 10 | was determined intraperitoneally, and found to be 600 mg./kg. This result shows that the antibiotic is of very low toxicity.

According to a feature of the invention, a process for the production of 19,402 R.P. comprises inoculating an aqueous nutrient medium, containing assimilable sources of carbon, nitrogen, and mineral salts, with a culture of the strain Streptomyces peruviensis, or a 19,402 R.P. producing mutant thereof, allowing aerobic fermentation to take place until a substantial amount of 19,402 R.P. is produced by the said microorganism in the said culture medium and isolating 19,402 R.P. as such, or an alkali metal salt thereof, from the culture medium.

The source of carbon may comprise carbohydrates such as glucose, sucrose, dextrose, starch, lactose, or molasses; or sugar-alcohols, especially mannitol and glycerin. However, animal or vegetable oils such as lard or soya bean oil may also be employed with advantage.

Suitable sources of nitrogen for the fermentation may be extremely varied. They may be simple mineral or organic salts of ammonia such as the chloride, sulphate, nitrate, phosphate, acetate, lactate, citrate, and tartrate. There may also be employed much more complex substances of animal or vegetable origin such as meat extracts, fish flours, soya bean meal, peanut flour, corn-steep, extracts and autolysates of yeast, and casein hydrolysates.

Among the mineral elements employed some have a buffering effect such as calcium or magnesium carbonate and alkali or alkaline earth metal phosphates. Others afford the ionic equilibrium necessary for the optimum production of the antibiotic such as the chlorides or sulphates of alkali or alkaline earth metals. Finally, some have a more specific action upon the metabolic reactions of Streptomyces peruviensis. These are the salts of zinc, cobalt, copper, manganese and iron.

The pH of the fermentation medium at the start of culture should be between 6.0 and 7.5. The optimum fermentation temperature is about 30°C. but a satisfactory yield is obtained with temperatures between 25° and 35°C. Aeration of the fermentation liquors is not a critical factor, but, nevertheless, aerations of 0.5 to 2 liters of air per liter of broth per minute are particularly suitable. Very good yields of 19,402 R.P. are obtained after about 5 days of culture.

The fermentative growth of Streptomyces peruviensis may be carried out by surface-culture technique, but submerged culture methods following the techniques which are commonly used for this kind of fermentation are preferred.

These conditions for the culture of Streptomyces peruviensis for the production of 19,402 R.P. are similar to the conditions described in British Pat. No. 846,801 for the production of the antibiotic 6,798 R.P., which is an amphoteric substance, also obtained by cultivation of the same strain of streptomyces.

19,402 R.P. is isolated from the fermentation broths by conventional methods for the extraction and purification of acid non-dialysable antibiotics, for example as described in British Pat. No. 1,086,780 entitled "New Antibiotic" applied for on November 16, 1965 and granted to Rhone-Poulenc S.A.

The fermentation broth may be filtered at a pH greater than or equal to 5, preferably between 7 and 9, but under these conditions a large part of the 19,402 R.P. remains in the filtration cake which also has to be treated in order to extract the desired antibiotic. Furthermore, it is then necessary to separate 19,402 R.P. from the antibiotic 6,798 R.P., which has also been produced during the cultivation of Streptomyces peruviensis and has also passed into the filtrate.

It is thus preferable to filter the broth at a pH below 5 and preferably close to 4; under these conditions all the 19,402 R.P. remains in the filtration cake from where it may be extracted at a pH of between 3 and 7 by means of water containing a low molecular weight aliphatic alcohol, i.e., an aliphatic alcohol containing at most five carbon atoms, such as methanol, ethanol or propanol.

The fermentation broth may also be passed through a column containing an ion exchange resin of strongly anionic character and high porosity, and the exchanger then eluted with an aqueous-alcoholic solvent, for example, aqueous methanol, containing an electrolyte. This method also suffers from the disadvantage of requiring a subsequent separation of 19,402 R.P. from 6,798 R.P.

Crude 19,402 R.P. may be isolated from the aqueous-alcoholic solutions indicated above by concentrating the solution to a small volume; this concentration is conveniently carried out at a temperature below 40°C. under reduced pressure. The crude antibiotic, or if desired one of its alkali metal salts, precipitates on cooling and/or on addition of a poor solvent for 19,402 R.P. or its alkali metal salts, for example, anhydrous ethanol or acetone.

19,402 R.P. can then be purified by fixing it on an ion exchange resin of strongly anionic character and of high porosity and then eluting with an aqueous-alcoholic solution containing an electrolyte such as sodium, ammonium, potassium, calcium or magnesium chloride at a concentration of 5 to 50 g. per liter of eluant. The eluate is then concentrated to a small volume at a temperature below 40°C. and under reduced pressure, and the concentrate is dialysed against a stream of distilled water by means of a regenerated cellulose membrane. The inorganic salts and various impurities are entrained by the water and 19,402 R.P. remains completely in the dialysed solution. The purified antibiotic 19,402 R.P. is obtained by lyophilising this solution.

In order to obtain ever purer 19,402 R.P., conventional methods may be employed, such as chromatography on various absorbents, countercurrent distribution or partition between various solvents. It has proved especially advantageous to chromatograph the antibiotic in aqueous solution on silica gel and to elute with a mixture of propanol and ammonia.

It will be understood that the various methods referred to above for the extraction, isolation and purification of 19,402 R.P. may be repeated several times as required for the production of this antibiotic in a form appropriate for the envisaged application.

After these various treatments 19,402 R.P. is preferably obtained in the form of an alkali metal salt. Such a salt may thereafter, if desired, be converted to the free acid by preparing a concentrated solution of the alkali metal salt in water and passing this over a strongly cationic ion exchange resin.

The following non-limitative examples illustrate the invention. In the following the activity is always determined by biological determination by the diffusion method, using *Bacillus subtilis* as the sensitive microorganism and with reference to a pure sample of 19,402 R.P. as standard. This activity is expressed in units per mg. for solid products and in units per cc. for solutions. The unit (abbreviated to "$u$") is the minimum quantity of product which, when dissolved in 1 cc. of a suitable culture medium, inhibits the growth of *Staphylococcus aureus* 209 P under a particular set of conditions.

EXAMPLE I

A 170-liter fermentation vessel is charged with
corn steep — 4.800 kg.
cerelose — 2.400 kg.
sodium chloride — 0.600 kg.
magnesium sulphate — 0.120 kg.
water to make up to — 110 liters After having adjusted the pH of the mixture to 7.40 by means of concentrated sodium hydroxide solution ($d = 1.33$; 660 cc.), calcium carbonate (0.600 kg.) is added. The culture medium is then sterilised by bubbling steam at 122°C. through it for 40 minutes. After cooling, the volume of the broth is 120 liters and the pH is 6.95. The medium is then inoculated with a culture (200 cc.) of the strain *Streptomyces peruviensis* in a stirred Erlenmeyer flask. The culture is developed at 30°C for 26 hours with stirring and aeration with sterile air; it is then ready for inoculation of the production culture.

The production culture is carried out in an 800-liter fermentation vessel charged with the following substances:
corn steep — 22 kg.
starch — 8.250 kg.
soya oil — 8.250 l.
calcium carbonate — 5.500 kg.
monopotassium phosphate — 1.100 kg.
magnesium sulphate — 1.100 kg.
hydrated cobalt chloride — 11 g.
water to make up to — 510 litres.

The medium is sterilised by bubbling steam at 122°C through it for 40 minutes. After cooling, the volume of the broth is 550 liters and the pH is 6.60 after addition of concentrated sodium hydroxide solution ($d = 1.33$; 250 cc.). The broth is then inoculated with the inoculum culture (55 liters) from the 170-liter fermentation vessel mentioned above. The production culture is carried out at 30°C for 123 hours with agitation, using a motor rotating at 285 rpm and aeration with 25 m³/hour of sterile air. The pH of the medium is then 8.1 and the volume of the broth is 520 liters. The amount of antibiotic present in the fermentation broth is 2420 $u$/cc.

EXAMPLE II

The fermentation broth obtained by the procedure of Example I (520 liters), of strength 2420 $u$/cc. and at pH 8.1, is adjusted to pH 4 by adding a 37 percent strength solution of phosphoric acid in a vat provided with a stirrer. A filtration aid (15 kg.) is then added. The mixture is filtered on a filter press and the filter cake is washed with tapwater (250 liters). The filtrate and the practically inactive wash water are discarded down the drain. The filter cake is suspended, with stirring, in a mixture (350 liters) consisting of methanol (270 liters) with the complement being water. The apparent pH of the mixture is then adjusted to 7 by adding a 10N sodium hydroxide solution. Stirring is continued for 1 hour, and the sludge is then filtered on a filter press. The filtrate is collected and the cake is washed with a water-methanol mixture (100 liters) containing 70 percent of methanol. The combined filtrate and wash liquid (amounting to 440 liters) has a strength of 2,320 $u$/cc. The cake is discarded.

The methanolic filtrate is concentrated under reduced pressure (35 mm.Hg) at 37°C to a volume of 6 liters, and ethanol (3 liters) is added to the concentrate. The antibiotic in the resulting solution is then precipitated by means of a mixture of ethanol (30 liters) and acetone (40 liters). The antibiotic is isolated by filtration, washed with acetone and dried in an oven in vacuo (5 mm.Hg). A brown product (1,009 g.) is thus obtained having a strength of 950 $u$/mg; this is the crude sodium salt of 19,402 R.P.

EXAMPLE III

The crude product (900 g.) prepared as described in Example II (of strength 950 $u$/mg.) is dissolved in distilled water (10 liters). The solution is filtered and then passed through a column (internal diameter 9 cm) containing 8 liters of Dowex 1X2 resin in chloride form (flow rate about 2 liters per hour). The column is successively washed with:

distilled water until the effluent is colorless — 8 l. at 2 l/hour formic acid — water mixture (10 : 90 by volume) — 24 l. at 12 l/hour formic acid — water-methanol mixture (10 : 10 : 80 by volume) — 24 l. at 12 l/hour methanol — water mixture (80 : 20 by volume) — 24 l. at 12 l/hour.

The antibiotic is then eluted with a mixture of methanol and water (80 : 20 by volume) to which 10 g/l. of potassium chloride have been added, using a flow rate of about 10 l./hour. The eluate is divided into fractions every 10 liters; the most active fractions (4,5 and 6) are recombined and concentrated under reduced pressure, at a temperature below 40°C, to 3 liters.

The concentrate is dialysed for 48 hours against distilled water (three times 40 liters) through a regenerated cellulose membrane to remove the salts and various impurities and is then lyophilized.

The potassium salt of 19,402 R.P. (35 g.) is obtained in the form of a beige amorphous powder of strength 13,800 $u$/mg, having an absorption maximum in the ultra-violet at 257 nm ($E_{1\ cm}^{1\ percent} = 84$).

EXAMPLE IV

The purified antibiotic obtained as described in Example III (5 g.) is dissolved in distilled water (20 cc.) and worked into a paste with activated silica gel (25 g.); the resulting paste is dried overnight under a pressure of 2 mm.Hg at ambient temperature and then introduced into the upper part of a column (internal diameter 4 cm) previously charged with dry activated silica gel (500 g.).

The column is successively developed with the following mixtures:

$n$-propanol and 2N ammonia (100:20 by volume) — 2.4 liters $n$-propanol and 2N ammonia (80:20 by volume) — 2 liters and then eluted with a mixture of $n$-propanol and 2N ammonia (80:30 by volume), dividing into fractions every 50 cc.

Fractions 1 to 50 on the one hand, and 51 to 75 on the other hand, are recombined, concentrated under reduced pressure at a temperature below 40°C in order to drive off the propanol, and then lyophilised.

Fractions 1 to 50 thus yield:
crop a : 1,300 mg. of strength 15,700 $u$/mg. 2
Fractions 51 to 75 thus yield:
crop B: 1,355 mg. of strength 15,800 $u$/mg.

Crop A (1,200 mg.) is dissolved in distilled water (20 cc.) and the solution added, with stirring and in small fractions, to Amberlite IR 120 resin in the acid state until a constant pH is obtained. The resin is filtered and rinsed with distilled water (10 cc.). The filtrate and wash liquids are combined, adjusted to pH 8.0 with sodium hydroxide solution and dialysed overnight against distilled water (twice 1 liter) through a regenerated cellulose membrane. The sodium salt of 19,402 R.P. is obtained in the solid form by lyophilising the solution which remains inside the membrane.

The pure sodium salt of 19,402 R.P. (945 mg.), of strength 17,800 $u$/mg, is thus obtained; it has the following elementary composition:

C = 46.25 percent, H = 6.9 percent, O = 36.7 percent, N = 4.1 percent,
P = 2.4 percent, S = 0.6 percent, Na = 3.05 percent.

The present invention also includes within its scope pharmaceutical compositions comprising 19,402 R.P., or a non-toxic salt thereof (preferably an alkali metal salt), in association with a pharmaceutically acceptable carrier, which may itself be physiologically active. Such compositions may be in any pharmaceutical form suitable for the method of administration envisaged.

The proportion of 19,402 R.P. in these pharmaceutical compositions will vary according to the desired therapeutic effect. For treating infections by Gram-positive microorganisms intramuscularly or intravenously, the dose is generally between 0.25 and 1.5 g. for an adult. This dose may be repeated eight days later if need be.

The following example illustrates pharmaceutical compositions according to the invention.

EXAMPLE V

A solution of the following composition is prepared:

sodium salt of 19,402 R.P. — 50 g.
distilled water sufficient to make up to — 500 cc.

This solution is sterilised by filtration through a bacteriostatic filter and is then divided between ampoules, introducing 5 cc. into each ampoule. The contents of the ampoules are lyophilised and then the ampoules are sealed. In order to use the antibiotic in these ampoules parenterally, an injectable solution is prepared immediately before use by adding distilled water (5 cc.) to the lyophilised contents of the ampoule. A solution (about 5 cc.) containing the active principle (0.5 g.) is then obtained.

We claim:

1. The antibiotic herein designated 19,402 R.P. in the form of the sodium or potassium salt, its sodium salt having the following characteristics:

a white amorphous powder which is very soluble in water, soluble in anhydrous methanol, and in ethanol, propanol and isopropanol containing water, very sparingly soluble in anhydrous ethanol, propanol, isopropanol and butanol, and insoluble in acetone, hexane benzene, diethyl ether, chloroform and ethyl acetate; it has the elementary composition C = 46.25 percent, H = 6.9 percent, O = 36.7 percent. N = 4.1 percent, P = 2.4 percent, S = 0.6 percent, Na = 3.05%; its optical rotation $[\alpha]_0^{20} = 1.9° \pm 1°$ (C = 0.4, water)

$[\alpha]_{436}^{20} = + 7.5° \pm 1°$ (C = 0.4, water), and $[\alpha]_{365}^{20} = 9° \pm 1°$ (C = 0.4, water) its ultra-violet spectrum (determined with a solution of 0.04 mg./l. in water) shows an absorption maximum at 256 nm ($E_{1\ cm}^{1\ percent} = 102.5$) and an absorption minimum at 227 nm ($E_{1\ cm}^{1\ percent} = 18.7$), and its infra-red spectrum (determined with tablets of a mixture with potassium bromide) shows principal absorption bands as follows: 3420 very strong, 3300 shoulder, 3100 shoulder, 2930 strong, 2870 medium, 1720 medium, 1675 strong, 1645 medium, 1620 medium, 1530 strong, 1420 medium, 1380 medium, 1330 medium, 1240 medium, 1155 shoulder, 1100 strong, 1070 very strong, 1045 strong, 972 medium, 955 weak, 883 medium, 855 medium, 800 weak, 775 weak, 710 shoulder, 665 medium, 595 weak, 575 strong, 495 medium, 475 shoulder, 425 weak and 385 shoulder.

2. Pharmaceutical compositions which comprise, as active ingredient an antibacerially effective amount of the sodium or potassium salt of 19,402 R.P. in association with a pharmaceutically acceptable carrier.

* * * * *